Oct. 20, 1959 W. H. KAUTZ 2,909,768
CODE CONVERTER
Filed Sept. 12, 1955
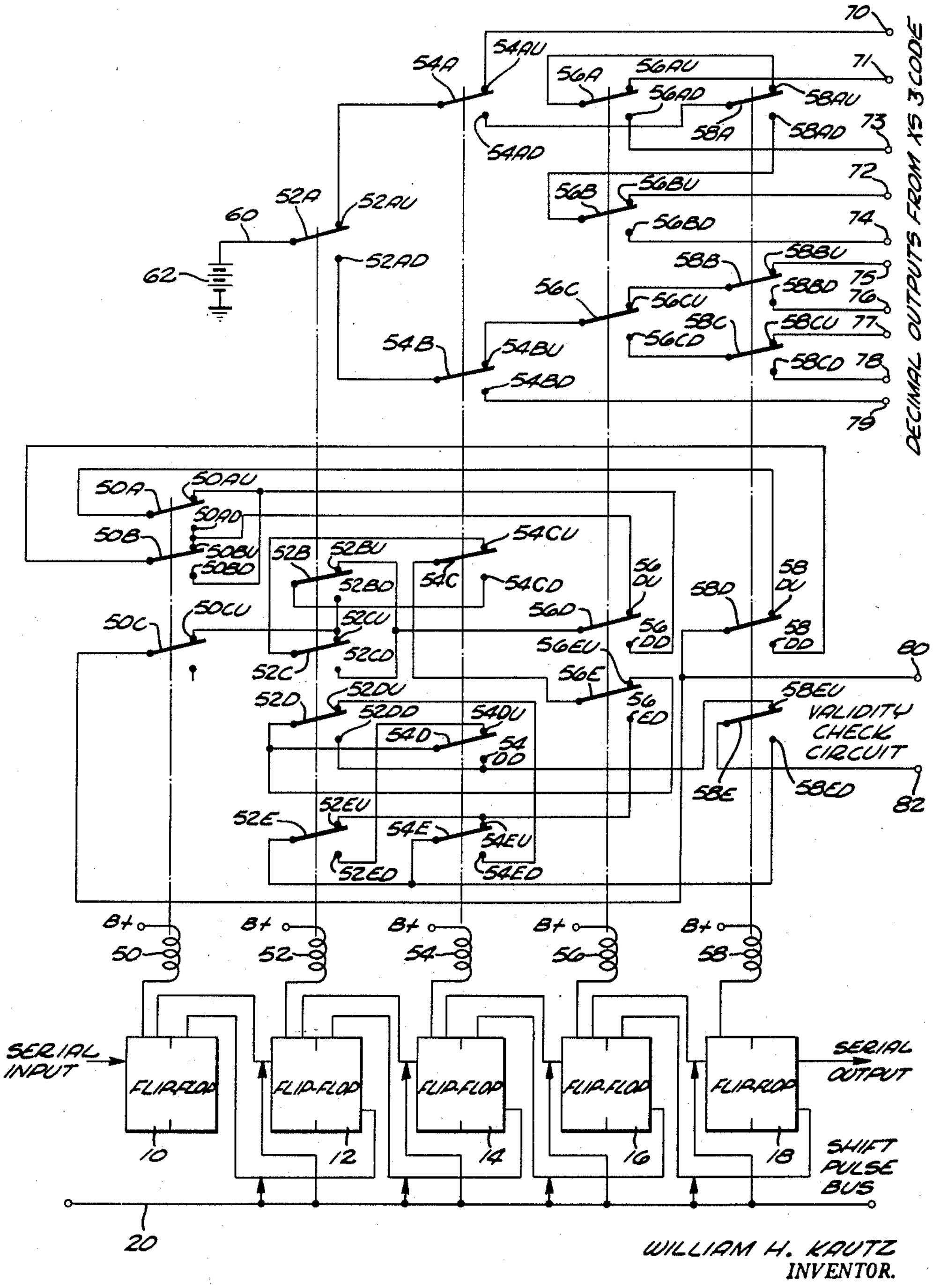
WILLIAM H. KAUTZ
INVENTOR.
BY Lyon & Lyon
ATTORNEYS

United States Patent Office 2,909,768

Patented Oct. 20, 1959

2,909,768

CODE CONVERTER

William H. Kautz, Palo Alto, Calif., assignor, by mesne assignments, to General Electric Company, New York, N.Y., a corporation of New York Application September 12, 1955, Serial No. 533,681

3 Claims. (Cl. 340—347)

This invention relates to code converters and, more particularly, to a relay arrangement for converting to a decimal form numbers expressed in an excess-three binary-code-to-decimal code while simultaneously checking the validity of the excess-three coded number.

The binary code, whereby numbers are represented by ones and zeros, is almost uniformly employed in present-day electronic computers and data-handling machines for the reason that number representation and/or letters are most easily attained by ones and zeros of the binary code, which electronically may be represented by the presence or absence of a voltage, the conduction or non-conduction of a tube, etc. Upon further investigation of the binary code, is was found that certain ones of the binary codes were better for purposes of mathematical computations than other binary codes. One of these has come to be known as the excess-three binary code. The reason for this name is that the usual binary representation of the number three corresponds to zero in this code. Binary four corresponds to one, etc. As an illustration, there is provided below a table, comparing the binary excess-three code with the binary code and the decimal equivalent, and also showing the use of a parity digit.

The parity digit is the name given to a digit which is employed to assist in checking any errors in the handling of the binary numbers. All the ones in a number are added, and then an additional one or zero is added in the parity digit position to make the total number of ones always come out to an odd number if an odd parity is used in the system. If an even parity is used, then a one or zero is placed in the parity position to make the total number of ones equal an even number. Accordingly, in systems employing the binary code plus parity, at various positions throughout the system a check is made by adding up the ones of the numbers being processed. Thereby, a very quick error indication is provided, so that the system can be inspected and errors detected before too great a deterioration of the data being processed can occur.

| Parity | Excess-three Binary | Binary | Decimal |
|---|---|---|---|
| 0 | 0 0 1 1 | 0 0 0 0 | 0 |
| 1 | 0 1 0 0 | 0 0 0 1 | 1 |
| 0 | 0 1 0 1 | 0 0 1 0 | 2 |
| 0 | 0 1 1 0 | 0 0 1 1 | 3 |
| 1 | 0 1 1 1 | 0 1 0 0 | 4 |
| 1 | 1 0 0 0 | 0 1 0 1 | 5 |
| 0 | 1 0 0 1 | 0 1 1 0 | 6 |
| 0 | 1 0 1 0 | 0 1 1 1 | 7 |
| 1 | 1 0 1 1 | 1 0 0 0 | 8 |
| 0 | 1 1 0 0 | 1 0 0 1 | 9 |

In an application entitled Error-Checking System, by Messrs. Bonnar Cox, Jacob Goldberg, and William H. Kautz, filed Oct. 10, 1955, Serial No. 539,504, now Patent No. 2,871,289, and assigned to a common assignee, there is shown the embodiment of the present invention being employed in the output from a system which employs a binary excess-three code in the system for processing the information inserted therein, but the system output must be in decimal code, since the output is applied to a regular adding-machine keyboard which has the feature of being able to print the decimal information inserted thereby. It will be appreciated that this invention will find employment wherever it is desired to go from one code to the other.

An object of the present invention is to provide a novel arrangement of relays to convert binary-excess-three code to decimal code.

Another object of the present invention is to provide a novel arrangement for checking the validity of an excess-three-binary code which includes a parity digit position.

Still another feature of the present invention is to provide novel, useful, and simple relay apparatus which can simultaneously perform both code conversion and validity checking in response to a binary-excess-three code input.

These and other objects of the invention are achieved in an arrangement whereby a relay is provided for each digit in the binary-excess-three code. The relays are excited in accordance with the ones in the binary number. A single input terminal is provided to which a voltage source is connected. Ten output terminals are provided, respectively associated with the decimal digits zero through nine.

The relays have movable arms and pairs of contacts associated therewith. These are interconnected in a manner so that when the relays are excited in accordance with the ones in the excess-three-binary code number one of the output terminals will be connected to receive a voltage from the input terminal. The one which is excited is the one representative of a decimal number equivalent to the binary-excess-three code number. In addition, there are two validity checking terminals. As a result of the excitation of the relays as indicated above, certain other ones of the contacts and movable arms are interconnected so that the two validity checking terminals are connected together if the number which excites the relays is valid.

To explain the last statement more clearly, the binary-excess-three code employed is only used to represent the numbers from zero to nine, using four binary digit positions. The fifth binary digit position is employed as the parity digit, so that only ten numbers are valid. However, five binary digits enable 32 possible combinations. The validity circuit is employed to show that the number applied to excite the relays is one of the ten acceptable numbers and is not any of the unacceptable combinations.

The novel features that are considered characteristic of this invention are set forth with particularity in the appended claims. The invention itself, both as to its organization and method of operation, as well as additional objects and advantages thereof, will best be understood from the following description when read in connection with the accompanying drawing, which is a circuit diagram of the embodiment of the invention.

The drawing which is shown in this application also is described as Figure 5 in the previously noted application to Messrs. Cox and Goldberg.

As described previously, each decimal digit is represented by four binary digits, which have added thereto a fifth binary digit known as the parity digit. A number in the decimal system will have five of these binary digits for each decimal digit. Therefore, by showing the circuit arrangement required for deriving a single decimal digit, it should be clear that one of these circuits is required for each decimal digit position employed in a data-handling system. It should also be obvious that if an alphanumeric code is employed, the invention also finds utility, since therein numbers are employed for representing letters of the alphabet.

Referring now to the drawing, there is shown in block diagram form a five-stage shift register way of example of apparatus for exciting the relays employed in the decoder. The shift register will consist of five flip-flop stages 10, 12, 14, 16, 18. These are interconnected in a manner whereby digits are applied from one end and are transferred along the flip-flop stages by the application of periodic shift pulses to the shift-pulse bus 20 until the shift register is filled. A flip-flop register of suitable type is well known and is described and shown, for example, in an article in Electronics Magazine, on pp. 181–184, November 1949 issue, entitled Gate Type Shifting Register, by Stevens and Knapton.

Digits of an excess-three binary number are applied serially with the least significant digit occurring first to flip-flop 10 and are transferred successively to the succeeding flip-flop stages until a complete number, followed by its parity digit, has been entered into the register. At this time, flip-flop 10 contains the parity digit; flip-flops 12, 14, 16 and 18, respectively, contain the most significant binary digit to the least significant binary digit. A relay is employ for each binary-digit position. Binary one is represented by a relay being excited, binary zero by nonexcitation. The relay coils 50, 52, 54, 56, 58 are each connected to respective flip-flops.

It is well known that a flip-flop stage has two stable states; one of these is usually represented as a zero state and the other as a one state. The shift register, accordingly, can represent a binary number by the states of the various flip-flops of which it is composed. When a flip-flop is in the one state, one of the two tubes of which it is composed is conducting. When it is in the zero state, the other of the two tubes of which it is composed is conducting. The nonconducting tube is usually biased substantially to cut off in these cases. The relay coil in each case is connected to the one side of the flip-flop stage with which it is associated. Therefore, when the flip-flop stage in the shift register represents a one, current is drawn through the relay coil which is connected to that stage and the relay is excited. When the flip-flop stage is in its zero condition, no current is drawn through the one side, and the relay coil is not excited. It should therefore be obvious that the ones of the relay coils which are excited are those corresponding to the one digits in the binary number.

Each of the relay coils from the least-significant digit position to the most-significant digit position has associated therewith five movable arms with a pair of contacts provided for each movable arm. The relay employed in the parity digit position requires only three movable arms and three pairs of contacts for those. For the purpose of maintaining the references to the contacts and the movable arms clear, the movable arms associated with relay coil 58, for example, will be designated as 58A, 58B, 58C, 58D, 58E. Each pair of contacts associated with the movable arm will be designated as 58AU, which represents the contact with which the movable arm is in contact when the relay coil is not excited. Contact 58AD represents the contact with which the movable arm will connect when the relay coil is excited. Thus, the movable arms are all shown in the nonexcited positions. Therefore, movable arm 58D connects with contact 58DU.

First the portion of the relay contacts and movable arms that are employed for conversion from excess-three-to-decimal will be considered. In this connection, an input terminal 60 is connected to a source of potential 62 and also to a movable arm 52A. The contact 52AU connects with movable arm 54A. Contact 52AD connects with movable arm 54B. Contact 54AU connects with output terminal 70. There are 10 of these output terminals 70 through 79, each one of which is associated with a different decimal digit as represented in the units position of the reference numerals. Contact 54BD is connected to terminal 79. Contact 54AD is connected to movable arm 58A. Contact 54BU is connected to movable arm 56C. Movable arm 56A connects with 58AU. Movable arm 56B connects with contact 58AD. Contacts 56AU and 56AD respectively connect with terminals 71 and 73. Contacts 56BU and 56BD respectively connect with terminals 72 and 74. Contacts 56CU and 56CD respectively connect with movable arms 58B and 58C. Contacts 58BU and 58BD, 58CU, and 58CD respectively connect with terminals 75 through 78.

In operation, as previously stated, the relay coils are excited which correspond to the ones in the excess-three-binary number which is to be converted to decimal. Thus, by way of illustration, binary number 1100, corresponding to nine in the decimal system, will cause excitation of relay coils 52 and 54. Movable arm 52A makes contact with contact 52AD. Movable arms 54A and 54B are also pulled down to their lower contacts. A path may be traced from the source of potential 62 to the input terminal 60 through movable arm 52A, movable arm 54B, contact 54BD, to output terminal 79 corresponding to a decimal nine. No current will be applied to any of the other output terminals.

It should be noted that since the parity digit forms no part of the number and is only used for checking purposes, the code-converting section of the relays does not have any contacts or movable arms for the parity digit position. It should further be noted that there are only a very few relay contacts and movable arms employed for the conversion. There is only one movable arm and a pair of contacts for the most-significant digit position, two movable arms and associated contacts for the next-most-significant digit positions, and the remaining digit positions respectively employ three movable arms and associated pairs of contacts. These are all interconnected so that upon excitation of the relays with which they are associated current is applied only to the output terminal representative of the decimal number corresponding to the excess-three-binary-code relay excitation.

Reference is now made to the validity-check-circuit portion of the relays. These employ the remaining movable arms and pairs of contacts associated therewith. The validity output terminals are respectively designated as 80 and 82. These may be connected to any desired warning or stopping system which operates when there is no closed circuit presented after a number has been entered into the shift register. Terminal 80 is connected to movable arms 58D and 50C. Terminal 82 is connected to movable arm 58E. Movable arms 50A and 50B respectively connect with contacts 58DU and 58DD. Contacts 50AU and 50BD connect to contact 56DD. Contacts 50AD and 50BU connect to contact 56DU. Contact 50CU connects with contacts 52BD and 52CU. Movable arms 52B and 52C respectively connect with contacts 54CD and 54CU. Contacts 52BU and 52CD connect to movable arm 56D. Movable arm 54C connects with movable arm 56E. Contact 52DU is connected to contact 54ED. Movable arm 52D is connected to movable arm 54D and contact 56EU. Contact 52DD connects with contact 54DD and contact 58EU. Movable arm 52E connects with movable arm 54E and contact 58ED. Contact 52ED connects with contact 54DU. Contact 52EU connects with contact 56ED and also contact 54EU.

The operation of this system should be obvious when an excess-three-coded-binary number and its parity digit (using even parity) is entered into the shift register. The movable arms will be operated by the excited relays to close the path between the two validity output terminals 80, 82. Using as an illustration of the operation of the system the number nine previously employed, this is represented by 01100. Accordingly, relays 52 and 54 will move the movable arms to the lower contacts. A path may be traced from terminal 80 through movable arm 50C up through movable arm 52B to movable arm 54C to movable arm 56E and through movable arm 52D or 54D to movable arm 58E and then out through terminal 82. As the second illustration, assume a number which requires the parity digit, such as, for example, the number 5 in excess-three binary code. This is represented by 11000. A path may be traced from terminal 80 through movable arm 58D, movable arm 50A to movable arm 56D to movable arm 52C to movable arm 54C to movable arm 56E to movable arm 52D to movable arm 58E to terminal 82. Other binary-excess-three numbers which are not one of the ten acceptable ones will not close a path between terminals 80 and 82.

From the above illustrations, it should become apparent how the embodiment of the invention operates both to provide the required code conversion and to determine the validity of the entire number. In determining number validity, the correctness of parity is also determined, since if the wrong parity digit is present even though the number portion (four digits) is correct the path between terminals 80 and 82 is not closed. Therefore, the embodiment of the invention checks parity, validity, and converts to decimal code simultaneously.

Accordingly, there has been described and shown above a novel, useful, and simple code-converting and validity-checking circuit. It will be appreciated that the relays may be excited by means other than a shift register, this having been shown merely by way of illustration, and should not be construed as a limitation upon the invention.

I claim:

1. A circuit for checking the validity of a binary-excess-three code number having a parity digit comprising first, second, third, fourth, and fifth relays respectively corresponding to the digit positions from the least to the most-significant digits of said binary-excess-three number and the parity digit, each of said relays having a plurality of movable arms and pairs of contacts associated therewith, a pair of validity-check output terminals one of which is connected to a movable arm of said fifth relay and the other is connected to a movable arm of said first and fifth relays, means to excite said relays responsive to the one digits in an excess-three-binary-coded number plus a parity digit, and means interconnecting the movable arms and pairs of contacts of said relays to provide a closed path between said pair of validity-check output terminals if the number applied by said means to excite said relays is valid.

2. A circuit for checking the validity of a binary-excess-three code number having a parity digit comprising first, second, third, fourth, and fifth relays respectively corresponding to the digit positions from the least to the most-significant digits of said binary-excess-three number and the parity digit, said first and second relays respectively having first and second movable arms and a separate pair of contacts associated with each, said third and fifth relays respectively having first, second, and third movable arms and a separate pair of contacts associated with each, said fourth relay having first through fourth movable arms and a pair of contacts associated with each, a pair of validity-check output terminals, means connecting one of said terminals to the first movable arm of said first relay and the third movable arm of said fifth relay, means connecting the other of said terminals to the second movable arm of said first relay, means connecting the first and second movable arms of said fifth relay to the first pair of contacts of said first relay, means connecting the first and second movable arms of said fourth relay to the first pair of contacts of said third relay, means connecting the third and second movable arms respectively of said fourth and third relays to one of the contacts of the second pair of said second relay, means connecting the fourth and third movable arms respectively of said fourth and third relays to one of the contacts of the second pair of said first relay, means connecting the first movable arm of said third relay to the second movable arm of said second relay, means connecting the first movable arm of said second relay to one of the contacts in the first and second pairs of contacts of said fourth relay, means connecting the others of said first and second pairs of contacts of said fourth relay together, means connecting one of the contacts of the first and second pairs of said fifth relay to one of the contacts of the first pair of said second relay, means connecting the other of the contacts of said first and second pairs of said fifth relay to the other of the contacts of said first pair of said second relay, means connecting one of the contacts of the third pair of said fifth relay to the other one of the contacts of said first and second pair of said fourth relay, means connecting one of the contacts of the third pair of contacts of said fourth relay and the second pair of contacts of said third relay to the other of the contacts of said second pair of said first relay, means connecting one of the contacts of the fourth pair of said fourth relay and the third pair of said third relay to the other of the contacts of said second pair of said second relay, means connecting the other of the contacts of the third pair of said fourth relay to the other of the contacts of the third pair of said third relay, means connecting the other of the contacts of the fourth pair of said fourth relay to the other of the contacts of the second pair of said third relay, and means to excite said relays responsive to the one digits in an excess-three-binary-coded number plus a parity digit whereby a closed path is provided between said pair of validity-check output terminals if the number applied by said means to excite said relays is valid.

3. A circuit for validity checking and converting a binary excess-three code number having a parity digit to a decimal number, comprising first, second, third, fourth, and fifth relays respectively corresponding to the digit positions from the least to the most significant digits of said binary number to be converted and a parity digit, each of said relays having a plurality of movable arms and a pair of contacts for each of said movable arms with one of which a movable arm is normally closed and with the other of which a movable arm is closed when the associated relay is rendered operative, an input terminal connected to a first movable arm of said fourth relay, ten output terminals respectively corresponding to the decimal digits zero to nine, means to excite said relays responsive to the one digits in an excess-three binary coded number plus a parity digit, means interconnecting some of the movable arms and pairs of contacts of said relays with said ten terminals to provide a closed path between said input terminal and the proper one of said ten terminals providing the decimal equivalent of said excess-three binary number responsive to excitation by said means to excite said relays, a pair of validity check output terminals, and means interconnecting others of the movable arms and pairs of contacts of said relays to provide a closed path between said pair of validity check output terminals if the number applied by said means to excite said relays is valid, said last-named means including first and second movable arms with separate pairs of contacts associated with each of said first and second relays, first, second, and third movable arms with separate pairs of contacts associated with each of said third and fifth relays, first, second, third, and fourth movable arms with separate pairs of contacts associated with said fourth relay, a connection between one of said pair of validity check output terminals and said first relay first movable arm, a connection between the other of said pair of validity check output terminals said first relay second movable arm and said fifth relay first movable arm, connections between said second and third movable arms of said fifth relay and a pair of contacts associated with the second movable arm of said first relay, connections between the first movable arms of said third and fourth relays, and one of the pair of contacts associated with the first movable arm of said first relay, connections between the second movable arms of said third and fourth relays and one of a pair of contacts associated with the first movable arm of said second relay, a connection between the third movable arm of said fourth relay and one of the pair of contacts associated with the third movable arm of said third relay, a connection between the fourth movable arm of said fourth relay and the other of the pair of contacts associated with the third movable arm of said third relay, a connection between one contact in each of the pairs of contacts associated with the second and third movable arms of said fifth relay and one of the contacts of the pair associated with the second movable arm of said second relay, a connection between the other of the pairs of contacts associated with the second and third movable arms of said fifth relay and the other of the pair of contacts associated with the second movable arm of said second relay, a connection between the third movable arm of said third relay and the first movable arm of said second relay, a connection between the second movable arm of said second relay and one of the contacts in each of the pairs of contacts associated with the third and fourth movable arms of said fourth relay, a connection between one of the pairs of contacts associated with the first movable arm of said fifth relay and the others of the pairs of contacts associated with the third and fourth movable arms of said fourth relay, a connection between one of the contacts of the pair associated with the second movable arm of said fourth relay, the second movable arm of said third relay, and the first movable arm of said first relay, a connection between the other contact of the pair associated with the second movable arm of said fourth relay and of the pair associated with the first movable arm of said third relay, and a connection between one of the contacts of the pair associated with the second movable arm of said third relay and the first movable arm of said fourth relay.

References Cited in the file of this patent

UNITED STATES PATENTS

| | | |
|---|---|---|
| 1,930,525 | Levy | Oct. 17, 1933 |
| 2,369,474 | Luhn | Feb. 13, 1945 |
| 2,539,014 | Frantz | Jan. 23, 1951 |
| 2,674,727 | Spielberg | Apr. 6, 1954 |
| 2,719,959 | Hobbs | Oct. 4, 1955 |